Figure 1:
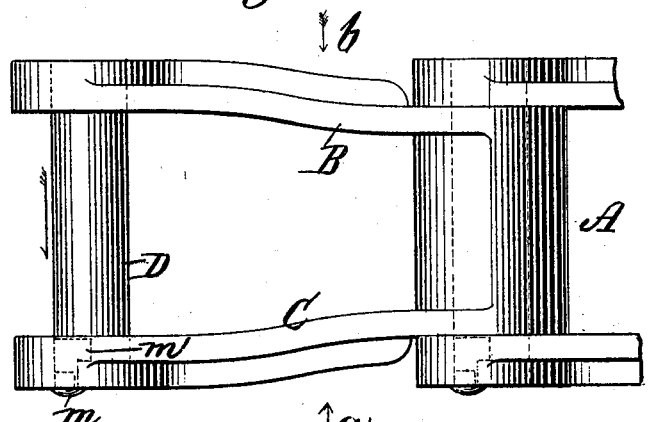

(No Model.)

J. N. McINTIRE.
CHAIN.

No. 593,811. Patented Nov. 16, 1897.

WITNESSES:

INVENTOR.

UNITED STATES PATENT OFFICE.

JACOB N. McINTIRE, OF NEW YORK, N. Y., ASSIGNOR TO THE EWART MANUFACTURING COMPANY, OF CHICAGO, ILLINOIS.

CHAIN.

SPECIFICATION forming part of Letters Patent No. 593,811, dated November 16, 1897.

Application filed September 25, 1897. Serial No. 652,965. (No model.)

*To all whom it may concern:*

Be it known that I, JACOB N. MCINTIRE, a citizen of the United States, residing at New York, in the county of New York and State of New York, have invented certain new and useful Improvements in Chains, of which the following is a full, clear, and exact description, reference being had to the accompanying drawings, forming part of this specification.

My invention relates to drive-chains, and especially to that type of such chains in which duplicate parts or links are coupled together by removable pintle-like devices or articulate male members, which pass through the perforated ends of the side bars of one link and also through the intermediate-arranged hollow end bar of another link. In this type of chain, as is well known, it is very important to have the pintle-like devices made extremely hard, so as to withstand the frictional contacting wear of the surrounding female member of the hinge-like joint, while at the same time it is necessary to retain such male members or pintles in place endwise after the assemblage of the parts of the chain against casual detachment or endwise movement of said pintle-like devices.

My invention has for its object to provide for use a chain of the kind above mentioned provided with a very simple and efficient means of securing in place endwise the pintle-like devices against removal casually, but which will readily permit the removal of a pintle and the substitution therefor of a new one by simply forcibly driving out the pintle to be removed and fastening in place a substitute therefor by simply upsetting the protruding end of a soft-metal fastening device; and to this main end and object my invention may be said to consist in the combination, with the side bars of a link, one of which has a circular perforation near its end and the other of which has a non-circular perforation similarly located, of a pintle or articulate male member having a sufficiently hard cylindrical bearing-surface and with one end portion of non-circular form of cross-section to fit into correspondingly-shaped aperture of one of the said side bars, and a soft-metal keying device adapted to engage at its laterally-projecting inner portion with a depression in the stock of said pintle, having its body portion located within a minor perforation of one of the said link side bars and having a slightly-projecting end adapted to be upset or removed over the or onto the outer surface of said link side bar, all as will be hereinafter more fully explained, and as will be most particularly pointed out in the claim of this specification.

To enable those skilled in the art to which my improvement relates to make and use drive-chains embodying the same, I will now proceed more fully to explain my invention, referring by letters to the accompanying drawings, which make part of this specification, and in which I have shown my said invention carried into effect in those precise forms in which I have so far barred it, though other mere modifications may of course be made without departing from the spirit of my invention.

Figure 2:
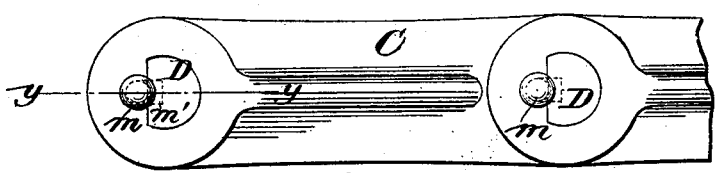
Figure 3:
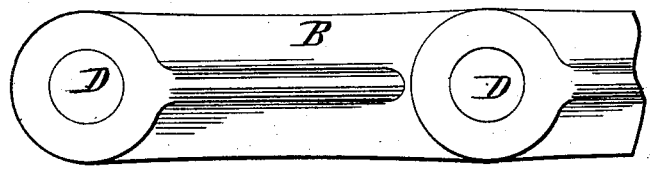
Figure 4:
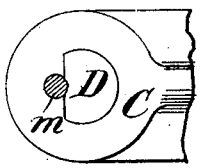
Figure 5:
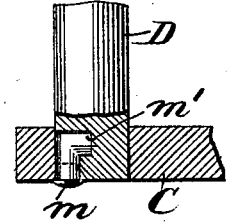
Figure 6:
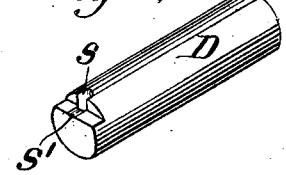
Figure 8:
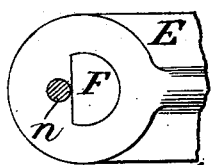
Figure 7:
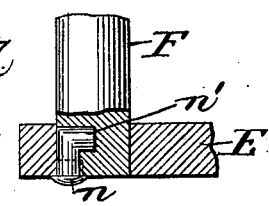

In the drawings, Figure 1 is a face view showing one link and part of another coupled thereto of a chain made according to my invention. Fig. 2 is a side or edge view of what is shown at Fig. 1, looking at the partial chain from the direction indicated by the arrow $a$ at Fig. 1. Fig. 3 is a similar edge view looking at the part shown in Fig. 1 from the direction indicated by the arrow $b$ in the last-named figure. Fig. 4 is a partial duplication of Fig. 2, but showing the parts there as they would appear before the upsetting or riveting over of the protruding end of the soft-metal pintle-fastening device. Fig. 5 is a partial central section on a plan indicated by the line $y\ y$ at Fig. 2. Fig. 6 is a perspective view of the pintle or male member of the hinge-like joint detached or separated from the other parts of the chain. Fig. 7 is a partial sectional view similar to that seen at Fig. 5, but showing a modification. Fig. 8 is a view similar to that seen at Fig. 4, but with the construction slightly modified according to the plan exhibited at Fig. 7.

In the several figures the same parts, wherever they appear, will be found designated always by the same letter of reference.

A is the hollow end bar of a link, a series of which latter when coupled together constitute a drive-chain of the kind hereinabove referred to in which each of such hollow end bars is cast integrally with two side bars located, respectively, at B and C, the end portion of which side bars farthest from the hollow end bar A, with which they are connected, is perforated for the reception and accommodation of one end of a cylindrical pintle or articulate male member D, all as clearly shown and as well understood by those familiar with the art of chain-making. One of said side bars B has a perfectly circular perforation (see Fig. 3) for the accommodation of one end of the pintle D, a cylindrical end of which just fits snugly within said perforation, while the other one of said side bars C (see Fig. 2) has a non-circular or segmentally-shaped aperture, within which fits a correspondingly-shaped end portion of said pintle D, said non-circular aperture of said side bar being supplemented with a smaller nearly circular aperture for the accommodation of the soft-metal fastening device $m$, all as plainly shown in the drawings. (See particularly Figs. 2, 4, and 5.)

As shown in Figs. 1 to 6, inclusive, the soft-metal fastening device is sort of L-shaped in longitudinal central section or side view, its longer cylindrical portion $m$ being inclosed between the apertured stock of the side bar C and the stock of the encircled cut-away and non-circular portion of the pintle D, a small part of the periphery of said part $m$ of said fastening device fitting into a slight depression at $s'$, (see Fig. 6,) slabbed off the portion of the pintle D, while the shorter leg or laterally-projecting part of said L-shaped fastening device shown at $m'$ (see Figs. 2 and 5) fits within a radially-located and near cylindrical recess or hole $s$ (see Figs. 5 and 6) of said pintle D, the inner leg of said fastening device projecting sufficiently beyond the outer face of the end portion of side bar C (after the parts shall have been properly assembled) to permit of said projecting portion being easily upset or headed over, as clearly shown at Figs. 1, 2, and 5.

In assembling or putting together the parts of the chain the hollow end bar A of one link is placed in a proper relative position between the free end of the side bars B and C, as seen in the drawings, to permit the insertion of the pintle D, which last-mentioned device is then inserted endwise by moving it in the direction indicated by the arrow at the left-hand side of Fig. 1 until the opposite extreme end portions of said pintle shall come flush, respectively, with the outer surfaces of the perforated portions of the link side bars and until the shouldered portion of one end of said pintle shall have been properly seated within the perforated end of side bar C, with its non-circular or segmentally-shaped portion fitted within the correspondingly-shaped portion of the aperture of said side bar and as plainly shown in the drawings; but before the insertion of said pintle a soft-metal keying device—such as shown at $m$ and $m'$, but without having its end upset—is placed properly within its seat, all respectively shown at $s$ and $s'$ of Fig. 6, in the portion $s$ of which the portion $m'$ of said fastening device fits snugly enough to assure the maintenance of the soft-metal fastening device in position in its said seat in the pintle end during the operation of assembling the parts of the chain, and after the assemblage thus of the parts mentioned the protruding end (see Fig. 4) of the soft-metal fastening device $m$ is simply upset or riveted over, as shown at Figs. 1, 2, and 5 of the drawings.

In a chain of the species shown, made as I have hereinabove described and as shown in the drawings, the entire peripheral surface or the cylindrical bearing-surface of the male member or pintle D of the hinge-like joint has, it will be seen, no breakage of or interference with its continuity by the presence of any splines or other recesses or depression in said surface, and the keying device for holding said pintle in place endwise, only relatively to the two side bars of the link, being confined wholly in the direction of its length (with the exception of its riveted head) within a space about equal to or a little less than the thickness of the stock of side bar C is an exceedingly small fastening device and one which can be manufactured at very little cost as compared, for instance, with such soft-metal keying devices as have heretofore been used in this type of chain, which were long enough to run the entire length of the pintle D. Furthermore, in the construction shown and described the manufacture of the chain is materially cheapened by reason of the fact that no long splines or recesses have to be cut in the pintle D, each one of which is simply to have a radially-arranged hole $s$ (see Figs. 5 and 6) bored, the end portion then shouldered by slabbing off part of the stock to produce the non-circular shape necessary for one end of the pintle, and a slight curved depression then made at $s'$ to accommodate a very small portion of the peripheral surface of the longer arm of the soft-metal fastening device, as shown. In the modification shown, however, at Figs. 7 and 8 the amount of work to be done on the pintle, and consequently the cost of its manufacture, is considerably lessened by slabbing off a little more of the stock to form the non-circular end portion and slightly varying the shape and size of the non-circular aperture in side bar C, so that after drilling a radial hole in the pintle at $s$ the stock of the pintle may be then drilled or slabbed off to a plane which, as shown at Fig. 8, is tangential to the supplemental hole $m$ in the end of the side bar E, so that when the soft-metal keying device shall have had its shorter leg $m'$ (see Fig. 7) snugly seated within the hole $s$ the perforated surface of the longer leg of said fastening device will just contact with the surface of the slabbed-off portion of the pintle end. For cheapness of manufacture this modification of my improved construction will, perhaps, be found more desirable in a commercial sense than the process form shown in Figs. 1 to 6, inclusive, of the drawings, although both process forms shown embody, of course, some idea of the invention made the subject of my application.

Another slight modification may of course be made without changing the principle of construction which is peculiar to my improved form of drive-chain.

Having now so fully described my improvement that those skilled in the art can make and use drive-chains embodying the same, what I claim as new, and desire to secure by Letters Patent, is—

In a drive-chain of the type herein shown and described, the combination, with the side bars B and C, one of which has a circular perforation in it and the other of which has a non-circular aperture, substantially such as specified, of a pintle-bar D, the bearing-surface of which is made very hard and has its continuity unbroken; and a soft-metal fastening device arranged as shown within the stock of the apertured side bar C, formed with a laterally-projecting portion which engages with a radially-arranged depression in the pintle and having its protruding end upset, or riveted over, as shown and described, whereby the pintle is held against displacement endwise, relatively to the said bars of the link, all substantially as and for the purposes hereinbefore set forth.

In witness whereof I have hereunto set my hand this 18th day of September, 1897.

J. N. McINTIRE.

In presence of—
M. A. O'BRIEN,
L. F. SILVA.